United States Patent [19]

Uchida et al.

[11] Patent Number: 5,218,067
[45] Date of Patent: Jun. 8, 1993

[54] ALLYL ESTER OLIGOMER COMPOSITION AND ORGANIC GLASS FOR OPTICAL MATERIAL COMPRISING SAME

[75] Inventors: Hiroshi Uchida; Kuniomi Marumo, both of Oita, Japan

[73] Assignee: Showa Denko K.K., Tokyo, Japan

[21] Appl. No.: 747,313

[22] Filed: Aug. 20, 1991

[30] Foreign Application Priority Data

Aug. 20, 1990 [JP] Japan .................................. 2-218570

[51] Int. Cl.⁵ .................. C08F 236/22; C08F 226/06; C08F 222/26; C08F 222/20
[52] U.S. Cl. .................................. 526/261; 526/322; 526/320; 526/292.4; 526/230.5
[58] Field of Search ............... 526/322, 261, 292.4, 526/230.5, 320

[56] References Cited

U.S. PATENT DOCUMENTS 4,521,577 6/1985 Romano et al. ............... 526/261

OTHER PUBLICATIONS

Hackh's Chemical Dictionary, 4th Ed., McGraw-Hill, New York, p. 60.
Encyl. Polym. Sci. Eng. vol. 4, "Diallyl and Related Polymers", pp. 779-811 (C. E. Schildknecht), 1986: Wiley, New York.
Hawley's Condensed Chemical Dictionary, 11th Ed. Van Nostrad, 1987 pp. 1027, 1206.

*Primary Examiner*—Joseph L. Schofer
*Assistant Examiner*—M. Nagumo
*Attorney, Agent, or Firm*—Sughrue, Mion, Zinn, Macpeak & Seas

[57] ABSTRACT

An allyl ester oligomer composition having a viscosity of 200 to 50,000 cP at 30° C. and a refractive index of 1.50 to 1.57 at 30° C., which is formed by mixing (a) 20 to 90% by weight of an allyl ester oligomer, (b) 10 to 80% by weight of at least one polyvalent allyl ester monomer selected from the group consisting of diallyl phthalate, diallyl isophthalate, diallyl terephthalate, diallyl adipate, triallyl (iso)cyanurate and triallyl trimellitate, and (c) up to 40% by weight of at least one monofunctional polymerizable monomer selected from the group consisting of vinyl benzoate, allyl benzoate, phenyl (meth)acrylate and benzyl (meth)acrylate.

15 Claims, No Drawings

ALLYL ESTER OLIGOMER COMPOSITION AND ORGANIC GLASS FOR OPTICAL MATERIAL COMPRISING SAME

BACKGROUND OF THE INVENTION (1) Field of the Invention

The present invention relates to an allyl ester oligomer composition which can be used as a spectacle material or an optical material for an optical disc, an optical fiber, a prism or the like, and to an organic glass having a relatively high refractive index and a high impact resistance, which is valuable for use as an optical material.

(2) Description of the Related Art

Since an organic glass has a lighter weight than an inorganic glass, an organic glass composed of a polymer of diethylene glycol bis(allylcarbonate) (hereinafter referred to as "CR-39") or methyl methacrylate is used. Nevertheless, the refractive index of the organic glass is 1.49 to 1.50 and is lower than that of the inorganic glass (the refractive index of white crown glass is 1.523), and accordingly, the thickness must be increased compared with the case of the inorganic glass, and thus the advantage of a reduction of the weight is lost, and when the organic lens is used for a sight-correcting lens, the organic lens is defective in that the appearance becomes poor with increase of the diopter.

As the means for coping with this disadvantage, various organic glasses formed by using a diallyl phthalate type monomer have been proposed, but these glasses are brittle or have a poor transmittance. If the diallyl phthalate type monomer is diluted with a monofunctional polymerizable monomer, to eliminate this defect, the heat resistance and solvent resistance become poor and the product is not satisfactory as an organic glass.

There is also known an allyl ester having terminal allyl ester groups and having in the interior thereof the following structure derived from a polybasic saturated carboxylic acid and a polyhydric saturated alcohol:

$$CH_2=CHCH_2O(CORCOOBO)_nCORCOOCH_2CH=CH_2$$

wherein R represents an organic residue derived from the polybasic saturated carboxylic acid, and B represents an organic residue derived from the polyhydric saturated alcohol.

In this case, especially when terephthalic acid or isophthalic acid is used as the polybasic saturated carboxylic acid, the refractive index is relatively high and the impact resistance is high. Nevertheless, the viscosity is very high and a cast polymerization used for CR-39 cannot be adopted. Trials have been made to overcome this defect by diluting the above allyl ester with various monofunctional polymerizable monomers, but in these cases, the heat resistance and solvent resistance become poor and an organic glass having a satisfactory performance cannot be provided.

SUMMARY OF THE INVENTION

An object of the present invention is to solve the foregoing problems involved in the conventional techniques, and to provide an allyl ester oligomer composition for preparing an optical material having a relatively high refractive index and an excellent impact strength and an organic glass formed by using this allyl ester oligomer composition.

The present inventors carried out an investigation with a view to attaining this object, and as a result, the present invention was completed.

Namely, the present invention is based on the finding that, by curing an allyl ester oligomer composition comprising (a) an allyl ester oligomer having a terminal allyl ester group and having an interior structure derived from a polybasic saturated carboxylic acid and a polyhydric saturated alcohol, (b) a specific polyvalent allyl ester monomer, and optionally, (c) a monofunctional polymerizable monomer having a benzene ring, which has an excellent copolymerizability with an allyl group, an organic glass satisfying the above requirements can be obtained.

In accordance with a first aspect of the present invention, there is provided an allyl ester oligomer composition having a viscosity of 200 to 50,000 cP at 30° C. and a refractive index of 1.50 to 1.57, which is formed by mixing (a) 20 to 90% by weight of an allyl ester oligomer, (b) 10 to 80% by weight of at least one polyvalent allyl ester monomer selected from the group consisting of diallyl phthalate, diallyl isophthalate, diallyl terephthalate, diallyl adipate, triallyl (iso)cyanurate and triallyl trimellitate, and (c) up to 40% by weight of at least one monofunctional polymerizable monomer selected from the group consisting of vinyl benzoate, allyl benzoate, phenyl (meth)acrylate and benzyl (meth)acrylate.

In accordance with a second aspect of the present invention, there is provided an organic glass for an optical material, which is obtained by copolymerizing the above-mentioned allyl ester oligomer composition.

DESCRIPTION OF THE PREFERRED EMBODIMENTS

The allyl ester oligomer (a) used in the present invention has allyl groups attached to terminals thereof and recurring units represented by the following structural formulae:

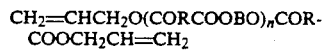  I

  II

  III

In the above structural formulae, R represents an organic residue derived from a dibasic saturated carboxylic acid, B represents an organic residue derived from a dihydric saturated alcohol, A represents an organic residue derived from a tribasic or more polybasic saturated carboxylic acid, Z represents an organic residue derived from a trihydric or more polyhydric alcohol, and x and y are positive integers of at least 2.

As the dibasic saturated carboxylic acid giving R, there can be mentioned succinic acid, glutaric acid, adipic acid, B-methyladipic acid, pimellic acid, cork acid, azelaic acid, sebacic acid, 1,2-, 1,3- or 1,4-cyclohexane-dicarboxylic acid, phthalic acid, isophthalic acid, terephthalic acid, diphenyl-p,p'-dicarboxylic acid, diphenyl-m,m'-dicarboxylic acid, 1,4-, 1,5-, 2,6- or 2,7-naphthalene-dicarboxylic acid, diphenylmethane-p,p'-dicarboxylic acid, diphenylmethane-m,m'-dicarboxylic acid and methylterephthalic acid. Of these acids, terephthalic acid and isophthalic acid are preferably used because the weatherability is good and the refractive index is relatively high. Adipic acid greatly improves the impact resistance, although the refractive index is low and the viscosity of the formed allyl ester oligomer is low. Accordingly, adipic acid can be used in combination with terephthalic acid or isophthalic acid within a range not causing a large reduction of the refractive index.

As the dihydric saturated alcohol giving B, there can be mentioned saturated glycols such as ethylene glycol, propylene glycol, 1,3-propaneglycol, 1,4-butanediol, 1,3-butanediol, neopentyl glycol, 1,5-pentanediol, hexamethylene glycol, 1,4-cyclohexane dimethanol, 2-ethyl-2,5-pentanediol and 2-ethyl-1,3hexanediol, and ether-containing dihydric saturated alcohols such as diethylene glycol, dipropylene glycol, an ethylene oxide adduct of bisphenol A and a propylene oxide adduct of bisphenol A. Of these dihydric saturated alcohols, propylene glycol, 1,3-butanediol, dipropylene glycol and a propylene oxide adduct of bisphenol A are preferably used because the viscosity is relatively low and the compatibility with the copolymerizable monomer is good.

As the tribasic or more polybasic saturated carboxylic acid giving A, there can be mentioned trimellitic acid and pyromellitic acid.

As the trihydric or more polyhydric saturated alcohol giving Z, there can be mentioned glycerol, trimethylolethane, trimethylolpropane, pentaerythritol and sorbitol.

The unsaturation degree expressed by the iodine value measured by the Wijs method means the number of grams of iodine that can be added to 100 g of the oligomer, and can be used as a criterion indicating the concentration of double bonds present in a polymer or the number of allyl ester groups present at terminals in the case of an allyl type oligomer. If the unsaturation degree is too high, too many allyl groups are present at terminals and a strain is generated during the curing reaction, and thus the mechanical strength values are reduced. In contrast, if the saturation degree is too low, the number of allyl groups present at terminals is too small and it is impossible to effectively carry out the curing reaction, and the solvent resistance of the cured product becomes low.

The allyl group concentration is represented by using the unsaturation degree expressed by the iodine value measured by the Wijs method as the criterion. The unsaturation degree may preferably be 20 to 150, more preferably 25 to 120.

The molecular weight of the allyl ester oligomer is preferably such that the number average molecular weight (Mn) as polystyrene measured by the GPC (gel permeation chromatography) is 500 to 50,000, especially 500 to 15,000, and the weight average molecular weight (Mw) is 1,000 to 1,000,000, especially 1,000 to 70,000, and the Mw/Mn ratio is 1.2 to 40.0.

The allyl ester oligomer can be synthesized, for example, from allyl alcohol, a lower ester of a saturated polybasic carboxylic acid and a polyhydric alcohol, as disclosed in Japanese Patent Application No. 63-262217.

To improve the viscosity and refractive index as described below, a starting material for an optical material is preferably synthesized by using the allyl ester oligomer in combination with a lower ester of an aromatic dicarboxylic acid, such as dimethyl terephthalate or dimethyl isophthalate, and a diol such as propylene glycol, 1,3-butanediol or an adduct of two moles of propylene oxide to bisphenol A. If the amount incorporated of the allyl ester oligomer is too small, the good impact resistance possessed by the allyl ester oligomer is poor, and if the amount is too large, the viscosity becomes too high and it becomes impossible to perform a cast polymerization customarily adopted for optical materials. Accordingly, the incorporated amount of the component (a) is preferably adjusted to 20 to 90% by weight, especially 50 to 80% by weight.

In the present invention, the polyvalent allyl ester monomer (b) should be used for reducing the viscosity without a reduction of the heat resistance, solvent resistance or impact resistance. As the polyvalent allyl ester monomer, there can be used at least one polyvalent allyl ester monomer selected from the group consisting of diallyl phthalate, diallyl isophthalate, diallyl terephthalate, diallyl adipate, triallyl (iso)cyanurate and triallyl trimellitate.

If the amount incorporated of the component (b) is too small, the viscosity cannot be reduced to a desired level, and if the amount is too large, the impact resistance or refractive index become too low. Accordingly, the amount incorporated of the component (b) is preferably adjusted to 10 to 80% by weight, especially 15 to 50% by weight.

Since some of diallyl monomers are formed as by-products at the synthesis of the allyl ester oligomer, the intended concentration of the polyvalent allyl ester monomer can be maintained by further incorporating an additional amount of the polyvalent allyl ester monomer according to need in the state where the diallyl monomer formed as the by-product is present.

To further improve the impact resistance when the concentration of the polyvalent allyl ester monomer is high, or to reduce the viscosity when the allyl ester oligomer concentration is high, (c) a monofunctional polymerizable monomer having a benzene ring, which has an excellent copolymerizability with the allyl group, can be combined with the components (a) and (b).

The copolymerizability with the allyl group and the possession of a benzene ring are both important factors. For example, when a monomer having a benzene ring but a poor copolymerizability with the allyl group, such as styrene, is used, the cured product becomes opaque and cannot be advantageously used for an optical material. Furthermore, when a monomer having a good copolymerizability with the allyl group but having no benzene ring, such as vinyl acetate or methyl methacrylate, is used, the refractive index becomes too low and the above problem cannot be solved.

As the monofunctional polymerizable monomer (c) having a benzene ring, which has an excellent copolymerizability with the allyl group, there can be mentioned vinyl benzoate, allyl benzoate, phenyl (meth)acrylate and benzyl (meth)acrylate. These monomers can be used alone or in the form of a mixture of two or more thereof.

When the amount incorporated of the monomer (c) is too large, the heat resistance and solvent resistance become poor. Accordingly, the amount of the monomer (c) is preferably adjusted to up to 40% by weight, especially up to 30% by weight.

In the allyl ester oligomer composition, not only the mixing weight ratio of the components but also the viscosity after the mixing or the refractive index is an important factor.

If the viscosity after the mixing is too high, it becomes impossible to carry out a cast polymerization customarily adopted for CR-39, and if the viscosity is too low, an operation of increasing the viscosity by a preliminary polymerization must be performed before the cast polymerization. The composition is preferably prepared so that the viscosity after the mixing is 200 to 50,000 cP (30° C.), especially 500 to 5,000 cP (30° C.) at the above-mentioned mixing ratio.

If the refractive index is too low, the refractive index remains low even after curing, and if the refractive index of the composition before curing is too high, the Abbe's number after curing becomes too small, and a good balance for an optical material cannot be maintained. Accordingly, the composition is prepared so that the refractive index after the mixing is preferably 1.50 to 1.57 (30° C.), especially 1.51 to 1.55 (30° C.), at the above-mentioned mixing weight ratio.

A radical curing agent may further be incorporated in the composition of the present invention. Any radical polymerization initiators capable of generating radicals under irradiation with heat, microwaves, infrared rays or ultraviolet rays can be used as the curing agent. An appropriate curing agent is selected and used according to the intended use of the composition of the present invention, the mixing ratio of the components, and the curing method.

Practically, a percarbonate customarily adopted for polymerization of CR-39, such as diisopropyl peroxydicarbonate, di-n-propyl peroxydicarbonate or di-sec-butyl peroxydicarbonate, is used in an amount of 1 to 10 parts by weight per 100 parts by weight of the polymerizable composition, and an organic lens or the like is preferably prepared by carrying out a cast polymerization at 30° to 100° C., as the existing manufacturing line thus need not be changed.

Additives such as an antioxidant, an ultraviolet absorber, a filler, a polymerization promoter, a polymerization inhibitor, an internal release agent, a coupling agent and a pigment can be added to the allyl ester oligomer composition of the present invention according to need, whereby the molding processability of the composition and the physical properties of the molded article can be improved.

The present invention will now be described in detail with reference to the following examples, that by no means limit the scope of the invention.

EXAMPLES OF SYNTHESIS OF ALLYL ESTER OLIGOMERS

REFERENTIAL EXAMPLE 1

A 1-liter three-neck flask equipped with a distilling device was charged with 600 g of diallyl terephthalate (DAT), 123.6 g of propylene glycol and 0.3 g of dibutyl tin oxide, and the mixture was heated at 180° C. in a nitrogen current while allyl alcohol formed was removed by distillation. When about 120 g of allyl alcohol was removed by distillation, the inner pressure was gradually reduced to 50 mmHg to increase the distillation speed of allyl alcohol. After the allyl alcohol had been removed in an amount close to the theoretical amount, heating was further conducted for 1 hour, then the pressure was reduced, and unreacted DAT monomer was removed by distillation to obtain 506 g of a polymerizable oligomer. This oligomer will be referred to as "allyl ester oligomer A" hereinafter.

REFERENTIAL EXAMPLE 2

A 1-liter three-neck flask equipped with a distilling device was charged with 600 g of DAT, 109.8 g of 1,3-butanediol and 0.3 g of dibutyl tin oxide, and the mixture was heated at 180° C. in a nitrogen current while allyl alcohol formed was removed by distillation. When about 100 g of the allyl alcohol was removed by distillation, the inner pressure was gradually reduced to 50 mmHg to increase the distillation speed of allyl alcohol. After the allyl alcohol had been removed in an amount close to the theoretical amount, heating was further conducted for 1 hour, then the pressure was reduced, and unreacted DAT monomer was removed by distillation to obtain 570 g of a polymerizable oligomer. This oligomer will be referred to as "allyl ester oligomer B" hereinafter.

REFERENTIAL EXAMPLE 3

A 1-liter three-neck flask equipped with a distilling device was charged with 600 g of diallyl isophthalate, 92.7 g of propylene glycol and 0.3 g of dibutyl tin oxide, and the mixture was heated at 180° C. in a nitrogen current while allyl alcohol formed was removed by distillation. When about 100 g of allyl alcohol was removed by distillation, the inner pressure was gradually reduced to 50 mmHg to increase the distillation speed of allyl alcohol. After the allyl alcohol had been removed in an amount close to the theoretical amount, heating was further conducted for 1 hour, then the pressure was reduced, and unreacted diallyl isophthalate monomer was removed by distillation to obtain 523 g of a polymerizable oligomer. This oligomer will be referred to as "allyl ester oligomer C" hereinafter.

REFERENTIAL EXAMPLE 4

A 1-liter three-neck flask equipped with a distilling device was charged with 540 g of DAT, 55.1 g of diallyl adipate, 123.6 g of propylene glycol and 0.3 g of dibutyl tin oxide, and the mixture was heated at 180° C. in a nitrogen current while allyl alcohol formed was removed by distillation. When about 120 g of allyl alcohol was removed by distillation, the inner pressure was gradually reduced to 50 mmHg to increase the distillation speed of allyl alcohol. After the allyl alcohol had been removed in an amount close to the theoretical amount, heating was further conducted for 1 hour, then the pressure was reduced, and unreacted DAT monomer was removed by distillation to obtain 498 g of a polymerizable oligomer. This oligomer will be referred to as "allyl ester oligomer D" hereinafter.

REFERENTIAL EXAMPLE 5

A 2-liter three-neck flask equipped with a distilling device was charged with 1000 g of DAT, 91.5 g of 1,3-butanediol, 349.7 g of Light Polyol BP-200S (2-mole propylene oxide adduct of bisphenol A supplied by Kyoeisha Yushi) and 0.5 g of dibutyl tin oxide, and the mixture was heated at 180° C. in a nitrogen current while allyl alcohol formed was removed by distillation. When about 166 g of allyl alcohol was removed by distillation, the inner pressure was gradually reduced to 50 mmHg to increase the distillation speed of allyl alcohol. After the allyl alcohol had been removed in an amount close to the theoretical amount, heating was further conducted for 1 hour, then the pressure was reduced, and unreacted DAT monomer was removed by distillation to obtain 1186 g of a polymerizable oligomer. This oligomer will be referred to as "allyl ester oligomer E" hereinafter.

The analysis values of these allyl ester oligomers are shown in Table 1.

These polymerizable allyl ester oligomers were used in the following examples.

TABLE 1

Analysis Values of Allyl Ester Oligomers

| | | Residual Allyl Monomer Concentration (% by weight) | Iodine Value | Viscosity (cP, 30° C.) | GPC Molecular Weight Mn | Mw |
|---|---|---|---|---|---|---|
| Referential Example 1 | Allyl Ester Oligomer - A | 12.6 | 76.9 | 715000 | $1.11 \times 10^3$ | $1.88 \times 10^3$ |
| Referential Example 2 | Allyl Ester Oligomer - B | 25.9 | 106.3 | 3200 | $1.03 \times 10^3$ | $1.46 \times 10^3$ |
| Referential Example 3 | Allyl Ester Oligomer - C | 23.8 | 103.9 | 8500 | $1.09 \times 10^3$ | $2.04 \times 10^3$ |
| Referential Example 4 | Allyl Ester Oligomer - D | 11.3 | 74.1 | 95000 | $1.14 \times 10^3$ | $2.06 \times 10^3$ |
| Referential Example 5 | Allyl Ester Oligomer - E | 21.6 | 94.1 | 123000 | $1.12 \times 10^3$ | $1.76 \times 10^3$ |

EXAMPLES 1 THROUGH 10 AND COMPARATIVE EXAMPLES 1 THROUGH 5

An allyl ester oligomer composition was prepared by using components shown in Table 2, and the viscosity and refractive index were measured.

Diisopropyl peroxydicarbonate (abbreviated to "IPP" in Table 2) was incorporated in an amount shown in Table 2 into the composition, and by cast polymerization using a cellophane-lined glass sheet, an organic glass molded article was obtained by elevating the temperature from 40° to 100° C. over a period of 16 hours. The physical properties of cured products obtained in the respective examples are shown in Table 2.

In the comparative examples, organic glass molded articles were prepared under the same curing conditions by using CR-39, allyl ester oligomer A, diallyl isophthalate monomer, diallyl terephthalate monomer and the like. When CR-39 was used, a transparent cured product was obtained, and the physical properties of the cured product are shown in Comparative Example 1 in Table 2. When allyl ester oligomer A alone was used, since the viscosity was too high, bubbles could not be removed at the casting step, and even if a reduced pressure deaeration was repeated many times, a satisfactory molded article could not be obtained (in Comparative Example 2, the light transmittance was low because of the presence of bubbles). When diallyl isophthalate monomer (Comparative Example 3) or diallyl terephthalate monomer (Comparative Example 4) was used, cracking occurred during the curing operation and a satisfactory molded article could not be obtained.

Note, the physical properties were measured according to the following test methods.

1. Light Transmittance

The measurement was carried out according to the method of ASTM D-1003.

2. Refractive Index and Abbe's Number

The measurement was carried out by using an Abbe refractometer (supplied by Atago).

3. Surface Hardness (Pencil Hardness)

The test was carried out under a load of 1 kgf according to JIS K-5400, and a highest pencil hardness that did not cause scratching was measured.

4. Impact Resistance

The test was carried out on a test piece having a thickness of 3 mm according to the drop-weight impact test using a Du Pont impact tester (supplied by Toyo Seiki Seisakusho); the dropped weight mass was 500 g, and the 50% break height was determined.

5. Iodine Value

An iodine flask having a capacity of 200 ml was charged with 0.25 to 0.35 g, precisely weighed, of the sample oligomer, and 30 ml of chloroform was added to completely dissolve the sample. Then, 20 ml, precisely measured, of Wijs reagent (7.9 g of iodine trichloride and 8.2 g of iodine were dissolved in 200 to 300 ml of glacial acetic acid, respectively, and both solutions were mixed so that the total amount was 1 l) was added to the sample solution by a hole pipette. Then, 10 ml of a 2.5% solution of mercuric acetate in glacial acetic acid was added to the solution and the mixture was allowed to stand in a dark place for 20 minutes to complete the reaction. Then, 5 ml of a freshly prepared 20% aqueous solution of KI was added to the reaction mixture, and the mixture was titrated with $0.1N$-$Na_2S_2O_3$ standard solution by using a 1% aqueous solution of starch as the indicator. Simultaneously, the blank test was carried out, and the iodine value was calculated according to the following formula:

$$\text{Iodine value} = \frac{(A - B) \times f \times 1.27}{S}$$

wherein A represents the amount (ml) of the $0.1N$-$Na_2S_2O_3$ standard solution required at the blank test, B represents the amount (ml) of the $0.1N$-$Na_2S_2O_3$ standard solution required at the present test, f represents the titer of the $0.1N$-$Na_2S_2O_3$ standard solution, and S represents the amount (g) of the sample.

6. Determination of Mn and Mw by GPC Method

Mn and Mw calculated as polystyrene were measured by GPC.

One each of SHODEX columns AC-80P, AC-802, AC-804 and AC-806 were connected in series in this order, and chloroform was used as the solvent and the measurement was carried out at a column temperature of 25° C. and a flow rate of 1.0 ml/min.

(1) At least 10 kinds of commercially available standard polystyrenes having a known average molecular weight were used, and the retention times of the DAT monomer and each polystyrene were determined. A calibration curve was prepared by making the relationship between the average molecular weight and the retention time approximate a cubic curve or broken line.

$$Mw = \frac{\Sigma M_i H_i}{\Sigma H_i}.$$

TABLE 2

| Composition | Example No. | | | | | | | |
|---|---|---|---|---|---|---|---|---|
| (% by weight) | 1 | 2 | 3 | 4 | 5 | 6 | 7 | 8 |
| Allyl ester oligomer - A | 70 | | | | 30 | 70 | 70 | 70 |
| Allyl ester oligomer - B | | 80 | | | | | | |
| Allyl ester oligomer - C | | | 80 | | | | | |
| Allyl ester oligomer - D | | | | 70 | 20 | | | |
| Allyl ester oligomer - E | | | | | | | | |
| Diallyl isophthalate | 30 | 20 | 20 | 20 | 10 | 20 | 20 | 20 |
| Diallyl terephthalate | | | | | | | | |
| CR-39 | | | | | | | | |
| Allyl benzoate | | | | | 10 | | | |
| Vinyl benzoate | | | | | | 10 | | |
| Phenyl methacrylate | | | | 10 | 20 | | | |
| Benzyl methacrylate | | | | | | | | 10 |
| Styrene | | | | | | | | |
| Viscosity (cP, 30° C.) of composition before curing | 1200 | 690 | 720 | 580 | 520 | 670 | 680 | 650 |
| Refractive index (30° C.) of composition before curing | 1.543 | 1.537 | 1.538 | 1.529 | 1.531 | 1.539 | 1.540 | 1.538 |
| IPP (% by weight) | 6 | 6 | 6 | 5 | 4 | 5 | 5 | 5 |
| Cured product Refractive index | 1.567 | 1.566 | 1.566 | 1.558 | 1.562 | 1.565 | 1.565 | 1.564 |
| Abbe's number | 30.3 | 30.2 | 30.8 | 34.1 | 33.2 | 30.1 | 30.0 | 32.7 |
| Light transmittance (%) | 93 | 93 | 93 | 93 | 93 | 93 | 93 | 93 |
| Impact resistance (50% break height) | 12 cm | 10 cm | 15 cm | 18 cm | 16 cm | 14 cm | 17 cm | 15 cm |
| Surface hardness | 3H | 2H | 3H | 2H | 2H | 2H | 3H | 3H |

| Composition | Example No. | | Comparative Example No. | | | | |
|---|---|---|---|---|---|---|---|
| (% by weight) | 9 | 10 | 1 | 2 | 3 | 4 | 5 |
| Allyl ester oligomer - A | | | | 100 | | | 70 |
| Allyl ester oligomer - B | | | | | | | |
| Allyl ester oligomer - C | 70 | 10 | | | | | |
| Allyl ester oligomer - D | | | | | | | |
| Allyl ester oligomer - E | | 50 | | | | | |
| Diallyl isophthalate | | 20 | | | 100 | | 10 |
| Diallyl terephthalate | 10 | | | | | 100 | |
| CR-39 | | | 100 | | | | |
| Allyl benzoate | | | | | | | |
| Vinyl benzoate | | | | | | | |
| Phenyl methacrylate | 20 | 20 | | | | | |
| Benzyl methacrylate | | | | | | | |
| Styrene | | | | | | | 20 |
| Viscosity (cP, 30° C.) of composition before curing | 420 | 630 | | | | | 370 |
| Refractive index (30° C.) of composition before curing | 1.536 | 1.552 | | | | | 1.538 |
| IPP (% by weight) | 4 | 7 | 5 | 6 | 6 | 6 | 10 |
| Cured product Refractive index | 1.566 | 1.574 | 1.498 | 1.565 | 1.572 | 1.570 | not cured |
| Abbe's number | 30.5 | 29.9 | 53.6 | 30.5 | 32.8 | 31.4 | |
| Light transmittance (%) | 93 | 92 | 93 | 78 | 93 | 93 | |
| Impact resistance (50% break height) | 16 cm | 21 cm | 19 cm | 29 cm | broken | broken | |
| Surface hardness | 3H | 2H | 2H | 2H | 3H | 3H | |

(2) In 20 ml of chloroform was dissolved 20 mg of the sample, and 0.5 ml of the solution was injected into the column through a line filter by using a loop injector. The obtained extraction curve data were automatically computed based on the calibration curve formed in (1) above in a data processing machine such as Simazu CR-4A to determine Mn and Mw. The peak was divided at intervals of 10 seconds, and the molecular weight Mi and peak height Hi at each dividing point were measured and Mn and Mw were calculated according to the following equations:

$$Mn = \frac{\Sigma H_i}{\Sigma (H_i/M_i)}, \text{ and}$$

The present invention provides an allyl ester oligomer composition that can be used as a starting material for an optical material, and an organic glass having a high refractive index and an excellent impact resistance, which is advantageously used as an optical material.

The organic glass of the present invention can be used not only for spectacle lenses but also for the production of articles for which high optical properties are required, such as optical discs, optical fibers, prisms and the like, and the industrial utilization value of the organic glass of the present invention is very high.

We claim:

1. An allyl ester oligomer composition having a viscosity of 200 to 50,000 cP at 30° C. and a refractive index of 1.50 to 1.57 at 30° C., which is formed by mixing (a) 20 to 90% by weight of an allyl ester oligomer having ester bonds and allyl ester groups attached to the terminals thereof, (b) 10 to 80% by weight of at least one polyvalent allyl ester monomer selected from the group consisting of diallyl phthalate, diallyl isophthalate, diallyl terephthalate, diallyl adipate, triallyl (iso)-cyanurate and triallyl trimellitate, and (c) up to 40% by weight of that least one monofunctional polymerizable monomer selected from the group consisting of vinyl benzoate, allyl benzoate, phenyl (meth)acrylate and benzyl (meth)acrylate.

2. A composition as set forth in claim 1, wherein the allyl ester oligomer (a) has recurring units represented by the following structural formulae:

—(CORCOOBO)—  I

—(CORCOO)$_x$—Z—O—CORCOO—  II

—(BOCO)$_y$—ACOO—BO—  III wherein R represents an organic residue of a dibasic saturated carboxylic acid, B represents an organic residue of a dihydric saturated alcohol, A represents an organic residue of a tribasic or more polybasic saturated carboxylic acid, Z represents an organic residue of a trihydric or more polyhydric alcohol, and x and y are positive integers of at least 2.

3. A composition as set forth in claim 2, wherein the dibasic saturated carboxylic acid is selected from succinic acid, glutaric acid, adipic acid, β-methyladipic acid, pimellic acid, cork acid, azelaic acid, sebacic acid, 1,2-, 1,3- or 1,4-cyclohexane-dicarboxylic acid, phthalic acid, isophthalic acid, terephthalic acid, diphenyl-p,p'-dicarboxylic acid, diphenyl-m,m'-dicarboxylic acid, 1,4-, 1,5-, 2,6- or 2,7-naphthalene-dicarboxylic acid, diphenylmethane-p,p'-dicarboxylic acid, diphenylmethane-m,m'-dicarboxylic acid and methylterephthalic acid.

4. A composition as set forth in claim 2, wherein the dihydric saturated alcohol is selected from ethylene glycol, propylene glycol, 1,3-propaneglycol, 1,4-butanediol, 1,3-butanediol, neopentyl glycol, 1,5-pentanediol, hexamethylene glycol, 1,4-cyclohexane dimethanol, 2-ethyl-2,5-pentanediol and 2-ethyl-1,3-hexanediol, diethylene glycol, dipropylene glycol, ethylene oxide adducts of bisphenol A and propylene oxide adducts of bisphenol A.

5. A composition as set forth in claim 2, wherein the tribasic or more polybasic saturated carboxylic acid is selected from trimellitic acid and pyromellitic acid.

6. A composition as set forth in claim 2, wherein the trihydric or more polyhydric saturated alcohol is selected from glycerol, trimethylolethane, trimethylolpropane, pentaerythritol and sorbitol.

7. A composition as set forth in claim 2, wherein R represents an organic residue of a saturated aliphatic dicarboxylic acid, a saturated alicyclic dicarboxylic acid or an aromatic dicarboxylic acid having no ethylenic double bond or acetylenic triple bond;

B represents an organic residue of a saturated aliphatic diol, a polyalkylene glycol or an alkylene oxide adduct of a bisphenol;

A represents an organic residue of an aromatic polycarboxylic acid having three or more carboxylic groups having no ethylenic double bond or acetylenic triple bond; and Z represents an organic residue of an aromatic polycarboxylic acid having three or more carboxyl groups having no ethylenic double bond or acetylenic triple bond.

8. A composition as set forth in claim 1, wherein the allyl ester oligomer (a) has an unsaturation degree of 20 to 150 expressed by the iodine value measured by the Wijs method.

9. A composition as set forth in claim 1, wherein the allyl ester oligomer has a number average molecular weight (Mn) of 500 to 50,000 and a weight average molecular weight ($M_w$) of 1,000 to 1,000,000, $M_w/M_n$ ratio being 1.2 to 40.0.

10. A composition as set forth in claim 1, wherein the amount of the polyvalent allyl ester monomer (b) is 15 to 50% by weight.

11. A composition as set forth in claim 1, wherein the amount of the monofunctional polymerizable monomer (c) is up to 30% by weight.

12. A composition as set forth in claim 1, wherein the viscosity is 500 to 5,000 cP at 30° C.

13. A composition as set forth in claim 1, wherein the refractive index is 1.51 to 1.55 at 30° C.

14. An organic glass for an optical material, which is obtained by copolymerizing an allyl ester oligomer composition as set forth in claim 1.

15. An organic glass as set forth in claim 14, wherein the allyl ester oligomer composition is mixed with a percarbonate in an amount of 1 to 10 parts by weight per 100 parts by weight of the composition, and the mixture is cast polymerized at 30° to 100° C.

* * * * *